US007255277B1

(12) United States Patent
Dragos, III

(10) Patent No.: US 7,255,277 B1
(45) Date of Patent: *Aug. 14, 2007

(54) METHOD OF DESIGNATING DATING STATUS

(76) Inventor: John Dragos, III, 2790 Sandhutton Ave., Apt. #8, Rockford, IL (US) 61109

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 0 days.

(21) Appl. No.: 11/399,159

(22) Filed: Apr. 6, 2006

(51) Int. Cl.
*G06K 7/10* (2006.01)

(52) U.S. Cl. ................. 235/462.01; 235/486; 235/487; 235/435

(58) Field of Classification Search ........... 235/462.01, 235/383, 446, 462.45, 462.46, 486, 487, 235/435; 705/10
See application file for complete search history.

(56) References Cited

U.S. PATENT DOCUMENTS

| | | | |
|---|---|---|---|
| 5,920,845 A | 7/1999 | Risemberg | |
| 5,963,951 A | 10/1999 | Collins | |
| 6,061,681 A | 5/2000 | Collins | |
| 6,594,502 B1 * | 7/2003 | Koester | 455/414.1 |
| 6,665,389 B1 | 12/2003 | Haste | |
| 6,896,263 B2 | 5/2005 | Matthews | |
| 2003/0191673 A1 | 10/2003 | Cohen | |
| 2003/0233270 A1 * | 12/2003 | Buss | 705/10 |
| 2004/0048605 A1 * | 3/2004 | Schaefer et al. | 455/414.2 |
| 2004/0128152 A1 | 7/2004 | Austin et al. | |
| 2004/0220922 A1 * | 11/2004 | Lovison et al. | 707/3 |
| 2004/0249811 A1 | 12/2004 | Shostack et al. | |
| 2004/0260781 A1 | 12/2004 | Shostack et al. | |
| 2005/0132290 A1 * | 6/2005 | Buchner et al. | 715/702 |
| 2005/0174975 A1 * | 8/2005 | Mgrdechian et al. | 370/338 |
| 2005/0281237 A1 * | 12/2005 | Heinonen et al. | 370/338 |
| 2007/0032240 A1 * | 2/2007 | Finnegan et al. | 455/445 |
| 2007/0069901 A1 * | 3/2007 | Tuck et al. | 340/573.1 |

* cited by examiner

*Primary Examiner*—Thien M. Le
*Assistant Examiner*—Edwyn Labaze
(74) *Attorney, Agent, or Firm*—Vedder, Price, Kaufmann & Kammholz, P.C.

(57) ABSTRACT

This disclosure generally relates to a system and method for dating. More particularly, this disclosure is a dating system and method that limits the embarrassment of rejection and minimizes costs of implementation based on a market recognition of an external sign to be associated with a dating status such as a color-coded bracelet.

14 Claims, 3 Drawing Sheets

METHOD OF DESIGNATING DATING STATUS

FIELD OF THE DISCLOSURE

This invention generally relates to a system and method for dating. More particularly, the invention is a dating system and method that limits the embarrassment of rejection and minimizes the cost of implementation based on a market recognition of an external sign to be associated with dating status, such as a color-coded bracelet.

BACKGROUND

Dating is a fundamental need of individuals and society. Dating methods are subtle and constantly evolving due to sociological conditions and changing tolerances. Dating methods and systems constantly adapt to trends. Individuals who desire to meet and date other individuals presently have a plurality of methods available to them, each with their own limitations. Known approaches to meeting other individuals include forced communications at dance clubs, social clubs, bars, on-line services, personal ads, networking, and the like. Often, however, conventional dating locations are flooded with loud music, which are costly and create difficulty communicating, especially if a person feel uncomfortable with his or her personal appearance.

Being present at such a location does not automatically convey the information that a person is available for dating. Today, dating is a guessing game. Individuals have to rely on conventional external signs such as the presence of a wedding band, sitting at a bar for a long period of time, and making sustained eye contact or being friendly with another person in the location. As a result, individuals may be disinclined to initiate communication with the intention of dating for fear of rejection or may be misled by social conventions leading to inaccurate assumptions about availability, sexual orientation, and the like. For example, men wearing a wedding band may still be interested in dating as long as the other person is interested in dating a married individual. Today, a married person resorts to removing the band to deceive prospective suitors. Another example is straight individuals who wish to join homosexual friends at their dedicated nightclubs and have no way to convey clearly to others an intention to meet members of the opposite sex.

Newspaper personals ads and on-line ads offer a little more flexibility. These potentially costly methods require dedication, patience, persistence, and the need to understand and decode a plurality of conventions to reach in a predetermined individual in a precise setting. These remote services typically lead to blind dates, which are often feared by shy individuals because it is nearly impossible to truly anticipate the other person's demeanor and empathy. Professional dating services or publications require the disclosure to a third party personal data, sexual desires, and other particular sexual practices that often must be held in strict confidence.

In contrast, attendance at bars, dance clubs, and other public places allows for better control of temporary and selective personal information that may not be intended for wider distribution, while on-line publications and newspaper personals allow for better screening of potential candidates before a first contact is initiated. Society tries awkwardly to accommodate these expectations by allowing individuals of similar interest to select certain times and locations where they may meet. Again, the secrecy of this expectation is often diluted by a flow of unwary individuals at the chosen location.

What is needed is a low-cost method and system that provides individuals to display and discern dating status information in an informal fashion in order to better initiate dating communications. This system and method may be used in public and semipublic places and allows an individual to temporarily and selectively display personal information based on prearranged social convention set up by a third party.

SUMMARY

Five-time winner of the TOUR DE FRANCE, cyclist Lance Armstrong, recently raised millions of dollars for his cancer foundation by offering for sale a flexible yellow bracelet produced at a minimal cost. Through a wide-reaching advertising and marketing campaign, it was conveyed to the population that, in exchange for the purchase of a bracelet at minimum price, a donation would be made to Armstrong's cancer foundation. In addition, the wearer of the bracelet would able to convey to individuals his interest and support for the cause simply by wearing the small coded item. Today a plurality of fundraising organizations have adopted this principle of donations associated with a visual display of support to promote their causes.

In the past, pins buttons, hats, t-shirts, and other small coded item have been used to support causes, convey political messages, and allow a wearer to express a personal conviction. This disclosure describes the first method and associated system that, after a targeted marketing campaign, uses a small coded item, such as a flexible red bracelet, to convey dating status information to facilitate and promote dating communications.

Compared to other dating systems, this disclosure describes a dating method and system that is simple, may be acquired at minimal cost, may be worn or removed upon arrival at a public place, and may be used in conjunction with an on-line service. A person is subjected to a marketing and advertising campaign informing him or her that a small coded item is distributed to all adults in a certain public place willing to meet other individuals. Armed with this knowledge, the individual may pay an entry fee at a nightclub or be given a bracelet at the door. By wearing the bracelet, other individuals will feel at ease in initiating dating communications with the wearer. By removing the bracelet, the individual stops sending the associated message to other individuals. Instead of homosexuals going to a first location and heterosexuals to a second, a person can simply enter a location, look around to confirm the private nature of this setting, and wear the appropriately colored bracelet.

The small coded item can be designed to convey a plurality of messages associated with dating, personal relationships, and other information. For example, in a first embodiment, the outside of the bracelet may be of a first color, and the inside of the bracelet of a second color indicating a subgroup or a more selective personal preference.

The disclosure, while describing a first embodiment, may be understood by one of ordinary skill in the art to be applicable to a wide range of closely related dating methods and systems, such as the use of a website associated with a section of possible users. The small coded item can be made specifically for a certain location, and a website can be designed to offer a service where wearers of a certain item may post personal data or search personal data or contact information of a person if more discretion is needed.

DETAILED DESCRIPTION

Figure 1:
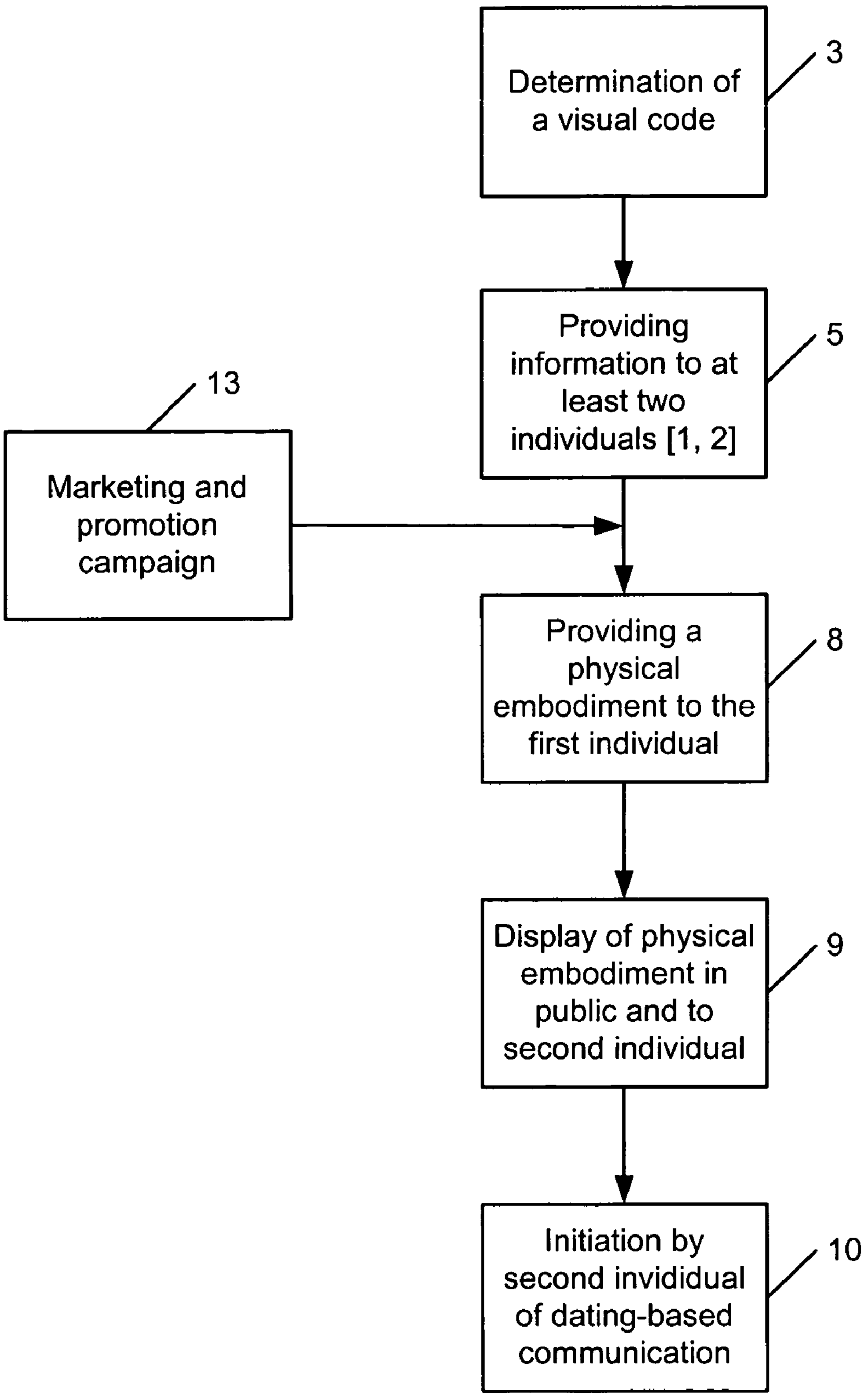
FIG. 1 is a flow chart of a preferred embodiment of the present disclosure of the method for establishing dating communication between at least two individuals.

FIG. 1 is a flow chart of a preferred embodiment of the present disclosure of the method for establishing dating communication between at least two individuals. At the core of dating is the establishment of a first dating communication between at least two individuals 1, 2 who do not yet know each other. While in the preferred embodiment a communication between two individuals is provided, it may be understood by one of ordinary skill in this art that a communication between more than two individuals is contemplated.

While communications with strangers is a basic function in society, no communication can be more troublesome for most individuals than communication based on dating. This disclosure relates to this very unique field of personal communications used by individuals for the specific purpose of courtship, union, copulation, and eventually reproduction. A first step of the method relates to the determination 3 by a third party, such as a dating service provider, of an acceptable visual code 4 that may be implemented cost effectively on a versatile physical embodiment. In the preferred embodiment, a flexible, color-coded bracelet is used as a small coded item since it may be worn and easily removed by individuals. The flexible, color-coded bracelet can be produced at a very limited cost since other organizations already manufacture similar bracelets for fundraising activities. It is understood by one of ordinary skill in the art of production of small coded items that the items may change over time based on fads in the marketplace (e.g., pins, buttons, bracelets, scarves, etc.) since these fads allow for the use of an existing low-cost production capacity. The object of this disclosure is not to limit this invention only to the current fad but to disclose a method and system where fads create a production capacity from suppliers able to provide at low production costs a specific item once the high demand has subsided.

Once the third party has determined 3 what small coded item is to be used in association with a specific acceptable visual code 4, the information is provided 5 to at least two individuals. In the preferred embodiment, a marketing and promotion campaign 6 is conducted in a city-wide area, but any scale of marketing and promotion campaign 6 may be conceived where the objective of providing information 5 to a target population 7 is possible as shown on FIG. 3. It is understood by one of ordinary skill in the art of marketing and promotion that a multitude of media can be used to reach the target population 7 effectively. In the preferred embodiment, an Internet, print, and television campaign is contemplated, but other types of media or available technology, such as wireless data, e-mail communication, movie product placement, infomercials, digital advertising, media cards, and the like are also contemplated. It is also possible to use the surface of the small coded item as an advertising space.

One physical embodiment that embodies the visual code on a small coded item is provided 8 to a first individual 1 of at least two individuals for use in order to generate dating communications. The small coded item is then displayed 9 by the first individual 1, preferably in such a way to allow a second individual 2 to perceive the small coded item in a public setting. In the preferred embodiment, the public setting is a bar or a nightclub, but it is understood by one of ordinary skill in this art that any public setting or semiprivate setting where a first individual wishes to generate dating communications is also contemplated. Such settings may comprise but are not limited to a restaurant, a social event, a wedding reception, a net-meeting, a sporting event, or other location where an individual can be expected to encounter other individuals and hope to generate dating communications.

The second individual 2, after he or she has perceived the small coded item, and based on the informed provided by a third party relating to the visual code 4, initiates 10 at will a dating communication by approaching the first individual 1 using normal communication techniques without fear of rejection based on the fact that the first person displays the visual code 4 with the expectation of being approached.

It is understood by one or ordinary skill in the art of dating that the nature of the dating communication, individual tastes, methods of communications, and motivations may vary greatly between individuals. While this disclosure of the present embodiment generally refers to a method for establishing dating communications between an unmarried woman and an unmarried man, a very wide range of possible embodiments is possible. In addition, with the arrival of digital personas acting as conduits over a network of physical persons, it is understood that this disclosure is also equally applicable to a digital person engaged in communication with a second digital person in the digital environment.

Figure 2:
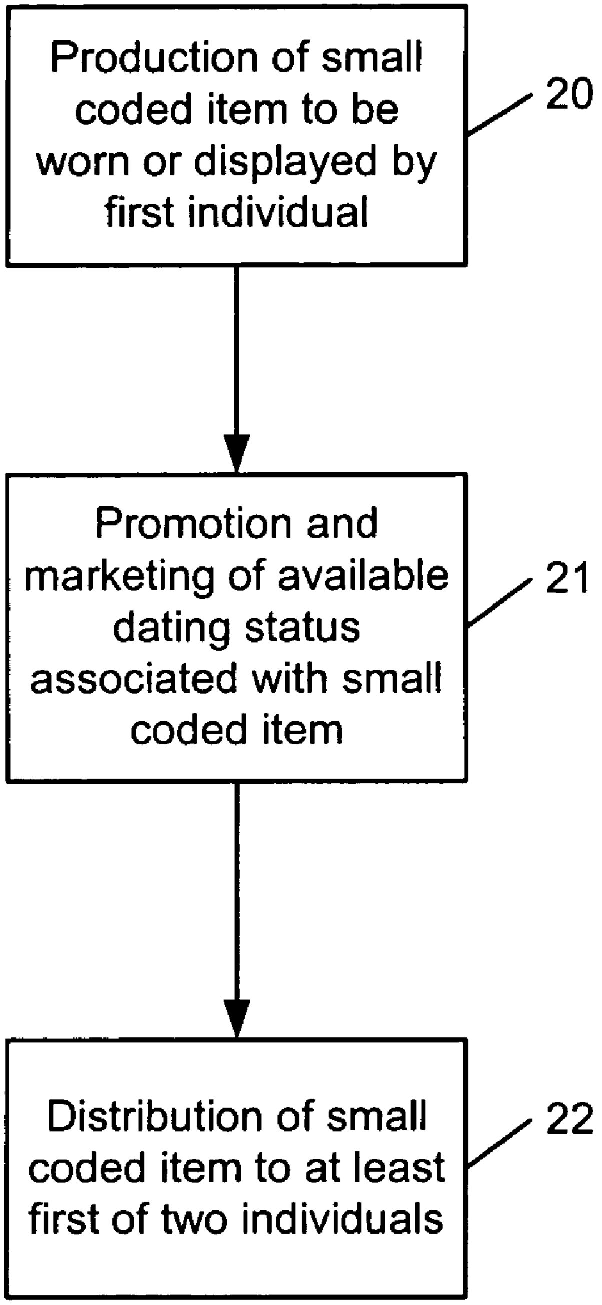
FIG. 2 is a flow chart of a preferred embodiment of the present disclosure of the method for marketing and providing a small coded item to at least two individuals using a desire for dating as a promotional tool.

FIG. 2 is a flow chart relating to a method of marketing and providing a small coded item, such as a colored bracelet as a small coded item 4, to at least two individuals. While the primary object of this disclosure is to describe a method for establishing dating communication, it is understood by one of ordinary skill in the art that an auxiliary consequence of particular interest to a third party is the creation in the marketplace of an easily produced and low-cost, small coded item that is obtained by individuals 1, 2 based on the fact that the coded item 4 has a usefulness associated with promoting dating communications.

The method comprises the production 20 of a small coded item 4 wherein the item can be worn or displayed openly by a first individual 1 in order to convey a message to a second individual 2 regarding a visual code, and ultimately, a dating status. Such a dating status is then used by the individuals 1, 2 to self-promote his or her dating status by associating himself or herself in public or semiprivate locations. A third party then promotes and markets 21 a dating status to be associated with the small coded item in order to create in the marketplace an understanding that the small coded item is associated with a particular dating status. Finally, the small coded item is distributed 22 either through sales or provided free of charge, based on the promotional and advertisement financing associated with the small coded item, to a first individual 1 in order for the small coded item to be displayed to a second individual 2.

It is understood by one of ordinary skill in the field of marketing that an important value must be placed on the small coded item once it is associated by the public with dating services and is associated with satisfying one of the basic human needs in this field. In the preferred embodiment, the dating status is single and is associated with a desire for dating and a receptivity of a second individual initiating a dating-related communication. Once again, the promotion and marketing of the small coded item is conducted in the media in a first embodiment, but it is understood by one of ordinary skill in the art that any type of advertising media may be utilized.

Figure 3:
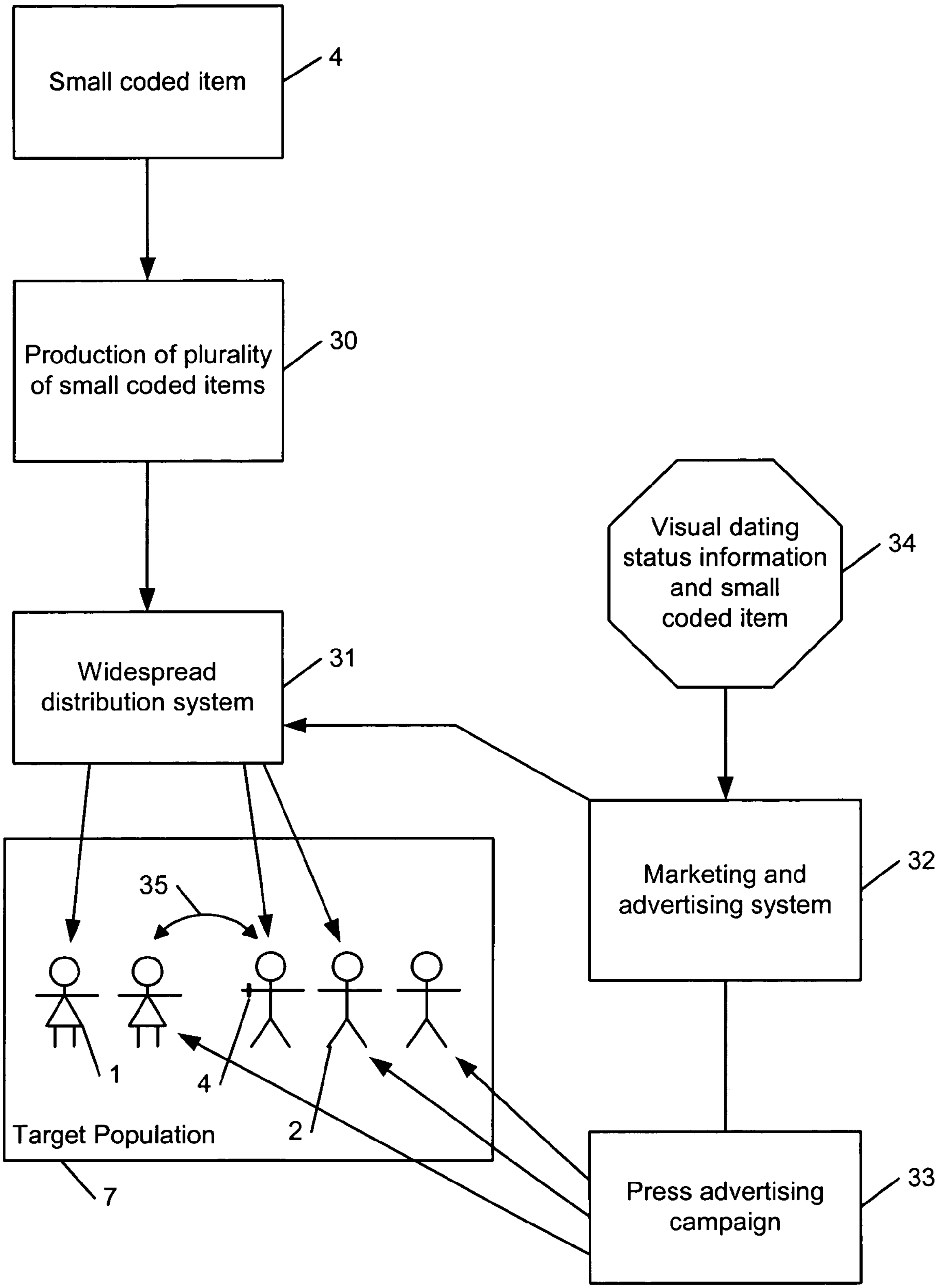
FIG. 3 is a functional diagram of a preferred embodiment of the present disclosure of the dating system.

FIG. 3 is a functional diagram of a preferred embodiment of the present disclosure of a dating system. This system includes a small coded item 4 to be first produced in a plurality of copies 30 and distributed 31 to potential users in a target population 7. The small coded item 4 can be worn or displayed openly by a first individual 1 to promote his dating status information to a second individual 2. The system also includes a marketing and adverting system 32 used to provide knowledge to a target population 7 regarding the small coded item 4 for distribution 31. The marketing system includes a widespread distribution 31 and a press advertising campaign 33 to convey to users sufficient information to associate the small coded item 4 with an available dating status 34.

As a result of the implementation of this system, a dating communication 35 is promoted and eventually initiated. In one preferred embodiment, the marketing and advertising system comprises an on-line website designed to provide users and individuals with additional information regarding the small coded item 4 and personal data on the users. In another preferred embodiment, a first user 1 is able to enter personal data at the on-line website, which may include personal contact information and the location where the dating communication was desired or where a visual contact was achieved without leading to the desired dating communication. The second individual 2, in order to research the first individual 1, is able to enter the location information where the visual contact was achieved in order to find the personal data of the first individual 1. It is understood by one of ordinary skill in the art that while dating communications are promoted, in some instances individuals are only able to make visual contact and need to initiate the dating communication at a later time in a second location.

Finally, it is also understood by one of ordinary skill in the art that while a person may use this system to display dating status information, other type of related information may be used, such as a particular sexual desire or a particular sexual practice. Due to the nature of this subject, all possible types of sexual desires and practices are contemplated and disclosed without being enumerated.

It is understood that the preceding is merely a detailed description of some examples and embodiments of the present invention and that numerous changes to the disclosed embodiments can be made in accordance with the disclosure herein without departing from the spirit or scope of the invention. The preceding description, therefore, is not meant to limit the scope of the invention but to provide sufficient disclosure to one of ordinary skill in the art to practice the invention without undue burden.

What is claimed is:

1. A method for establishing dating communication between at least two individuals comprising:

determining a visual code to be implemented on a first embodiment corresponding to a dating status;

creating and releasing in a marketplace and a public at large a widespread distribution campaign relating to the visual code corresponding to the dating status to be implemented on the first embodiment to a target population;

creating and releasing in the marketplace and to the public at large a of press advertising campaign to relate to the visual code corresponding to the dating status to be implemented on the first embodiment to the target population;

providing information relating to the visual code relating to a desire to establish a dating-related communication between at least two individuals to at least the two individuals;

providing a physical embodiment that embodies the visual code to the first of the at least two individuals;

allowing the first of the at least two individuals to wear or display openly the physical embodiment in a public setting; and allowing a second of the at least two individuals to establish the dating-related communication with the first of the at least two individuals after perceiving the physical embodiment that embodies the visual code, wherein the marketplace is a city-wide release and distribution.

2. The method of claim 1, wherein the visual code is a color-coded bracelet.

3. The method of claim 2, wherein the public setting is a bar or a nightclub.

4. A method for marketing and providing a small coded item to at least two individuals using a desire for dating as a promotional tool, the method comprising:

producing a small coded item, wherein said item can be worn or displayed openly by a first of at least two individuals to at least a second of the at least two individuals;

promoting and marketing an available dating status associated with the small coded item in order to create a market demand of the small coded item; and distributing the small coded item or supplying the small coded item free of charge upon which a paid promotional advertisement is embedded to at least a first of at least two individuals and displayed to at least the second of the at least two individuals.

5. The method of claim 4, wherein the small coded item is a color-coded bracelet.

6. The method of claim 5, wherein the available dating status is single and associated with a desire for dating and a willingness for a second individual of the at least two individuals to initiate a dating based communication.

7. The method of claim 4, wherein the small coded item is promoted and marketed in a media.

8. A dating system, said system comprising:

a small coded item produced in a plurality of copies for distribution, wherein the small coded item can be worn or displayed openly by a first of at least two individuals to provide a visual dating status information to of a second of at least two individuals; and a marketing and advertising system used to provide knowledge to a target population regarding the small coded item for distribution, wherein the marketing and advertising system comprises a widespread distribution system of the small coded item and a press advertising campaign to convey to users sufficient information to associate the small coded item with an available dating status, and the creation and release in a marketplace and a public at large the widespread distribution system relating to a visual code corresponding to the available dating status to be implemented on the first embodiment to a target population, and the creations and release in the marketplace and to the public at large of a press advertising campaign to relate to the visual code corresponding to the dating status to be implemented on the first embodiment to the target population, wherein the marketplace is a city-wide release and distribution.

9. The dating system of claim 8, wherein the marketing and advertising system further comprises an on-line website designed to provide users with additional information regarding the small coded item and users of the dating system.

10. The dating system of claim 9, wherein a first user of at least two individuals is able to enter personal data on the on-line website, wherein said personal data includes personal contact information and a location where a visual contact was achieved but a desired dating communication was not successful, to allow a second user of the at least two individuals to access the personal data by providing the location where the visual contact was achieved to retrieve the personal data and initiate the desired dating communication.

11. The dating system of claim 8, wherein the small coded item is a color-coded bracelet.

12. The dating system of claim 8, wherein the visual dating status information may be single.

13. The dating system of claim 8, wherein the visual dating status information may be based on a particular sexual desire.

14. The dating system of claim 8, wherein the visual dating status information may be based on a particular sexual practice.

* * * * *